Jan. 7, 1969  A. H. NELLESSEN ET AL  3,420,597
RETROREFLECTIVE STRUCTURE AND METHOD OF MAKING SAME
Filed April 13, 1964

APPLIED WET FILM.

DRIED FILM

DRIED AND ETCHED FILM.

INVENTORS
ALFRED H. NELLESSEN
ROBERT J. SCHOONOVER
BY Carpenter, Abbott, Coulter & Kinney
ATTORNEYS

United States Patent Office 3,420,597
Patented Jan. 7, 1969

3,420,597
RETROREFLECTIVE STRUCTURE AND METHOD
OF MAKING SAME
Alfred H. Nellessen, Roseville, and Robert J. Schoonover, St. Paul, Minn., assignors to Minnesota Mining and Manufacturing Company, St. Paul, Minn., a corporation of Delaware
Filed Apr. 13, 1964, Ser. No. 359,180
U.S. Cl. 350—105
Int. Cl. G02b 5/12
12 Claims

ABSTRACT OF THE DISCLOSURE

A new method for making retroreflective structures is disclosed; and this method comprises (1) applying upon a substrate a paint-like film of binder solids, relatively large pigment particles and transparent glass microspheres completely coated with a thin metal layer having a specular surface adjacent the glass of the microspheres, (2) drying that film to cause the exposed surface to assume a lenticular irregularity as caused by the metal coated microspheres projecting it outwardly in those locations occupied by the microspheres, (3) applying an etching solution over the outer face of the film for a time and at a temperature sufficient to remove the metal of the outer surface lenticular portion of the metal coated microspheres even though there is paint-like binder present as a veneer, and (4) washing the etching solution away from the surface of the structure. It has been found that the veneer coating of binder solids over the metal coated microspheres does not prevent the etching to remove the metal on the outer hemispherical portion of the microspheres projecting above the dried paint-like coating. Additionally, the etching penetration through the veneer binder coating, while effective to remove the metal on the outer half of the microspheres, does not attack the binder material in the lower portion of the microspheres. Thus, the microspheres are retained in the paint-like coating in firmly bonded condition even after etching.

This invention relates to the coating art, and more particularly to a new method for making retroreflective structures and novel compositions for use in the method as well as novel articles conveniently formed by practice of the method.

Retroreflection of light, sometimes called reflex reflection of light, relates to the return of incident light back toward its source in a brilliant cone with the axis of the cone essentially common with the incident beam of light, even though the incident beam strikes the retroreflective structure at an angle other than normal to the surface of the structure. Glass beads of about 1.9 refractive index, with underlying specular-reflective means, are commonly used as the composite retroreflective elements in such structures. For most efficient retroreflection, the underlying specular-reflective means should be continuous and contiguous with the underlying approximately hemispherical portion of the glass beads in the structure; and it is especially important that the composite retroreflective elements of such type should all be oriented with their specular-reflective means behind the underlying the beads of the retroreflective face of the structure. Random orientation of composite retroreflective elements, with some having their associated specular-reflective means tilted sideways or even located outwardly of the beads in the structure, seriously interferes with the attainment of the most intense retroreflection otherwise possible when retroreflective elements are all oriented with their glass bead lenses facing outwardly and with continuous and contiguous specular-reflective means underneath.

Heretofore, it has been necessary to employ several method steps in the manufacture of retroreflective structures in order to gain the aforenoted orientation for retroreflective elements of the type having hemispherical metallic caps. Even the most simple heretofore known method for making such structures involves the steps of coating a binder layer of a liquid paint-like material, pressing glass beads fully coated with metal approximately halfway into the binder layer either before or after most of the volatiles are removed from the composition of the binder layer, and then etching away the exposed approximately hemispherical portion of the metal coating on the beads to provide composite oriented retroreflective elements in the binder layer.

The method of this invention even further reduces the steps necessary to make retroreflective structures in which all retroreflective elements are fully oriented and of the efficient type having continuous and contiguous approximately hemispherical specular-reflecting caps underlying the same. Contrary to what would be expected in light of prior art practices, it has been found that the steps heretofore conducted as separate steps (i.e., first applying the coating of binder layer and then pressing fully metallized beads therein) may in fact be accomplished in a single step without interfering with effective etching of metal from the outer hemispherical portion of the beads. Indeed, even coloring material may be incorporated in the composition used for single step coating so as to provide, after etching, a layer of attractive daytime coloration in combination with efficient nighttime retroreflection.

The teachings of this invention are particularly useful in the art of reflex-reflecting a portion or an insignia or other limited part of a painted sign. Many painted signs are fabricated on a mass production basis. When small bead elements are applied to a wet paint insignia surrounded by dry paint or metal areas, problems associated with static electrical attraction to the dried paint or paint-free metal areas arise under mass production conditions. Further, smaller bead elements known as microspheres are difficult to apply by a drop-on technique to gain satisfactory results free of "flooding" or "drowning"; yet the smaller elements are most desired for intense retroreflection. Advantageously, the paint composition of the instant invention is readily applied to occupy a limited area such as that of letters in an insignia without altering other areas of a painted sign. After the paint on a sign so formed is dried, its painted face may be subjected to an etching treatment as hereinafter described to cause reflex-reflectorization of the area coated with the paint hereof without affecting other paint areas of the sign. Thus, the invention provides a solution to economical mass production of signs desirably reflex-reflectorized at least in part and which have not heretofore been reflex-reflectorized because of the problems and because of the expense required to do so. Now such signs may be made with economy as well as with the advantage of economically providing intense and attractive daytime coloration with nighttime retroreflection in the same portion of the sign.

The invention is also useful in the art of reflex-reflectorizing fence posts and like objects serving a marker function. Posts and similar articles may be dipped or sprayed or otherwise painted with a paintable composition of binder solids plus fully metal-coated beads, and thereafter subjected to an etching treatment to provide a marker of brilliant light retroreflection. No process is known to be so simple as this to provide intense and brilliant reflex-reflectorization of posts and like articles.

A variety of other uses for the compositions and resulting articles of the invention will be apparent to those skilled in the art. A suitable illustration is that of making license plates, where daytime coloration is needed in combination with reflex-reflection of light under nighttime conditions.

The invention will be described by reference to a drawing wherein.

Figure 1:
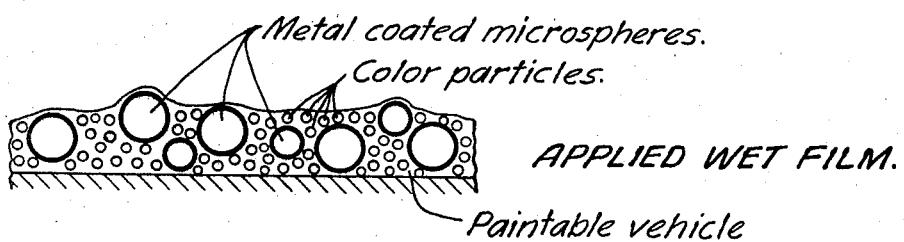
FIGURE 1 is a schematic cross section through a layer of a paintable composition of this invention immediately after the layer is applied and prior to removal of volatiles therefrom.

It will be evident that the drawing illustrates method steps involved in making the retroreflective structures or sheeting contemplated by the present invention. In some details, the steps are: firstly, apply a substantially continuous paint-like film of a mobile paintable composition containing fully metal-coated glass microspheres (which are glass beads of very small size) dispersed in a paintable binder vehicle of organic solids binder material and volatile liquid material; secondly, remove volatiles from the applied film, thereby to cause the exposed surface of the film to assume a lenticular condition of irregularity as caused by metal-coated microspheres projecting the film outwardly in locations occupied by the microspheres; thirdly, etch the metal from the outermost surface portion of the metal-coated microspheres in the layer; and fourthly, wash and dry the surface of the structure. While four steps are listed, it will be appreciated that the technique employed essentially amounts to coating out a layer of special composition and then etching the projecting outermost portion of metal from metal-coated microspheres in the layer to convert them into retroreflective complexes consisting of glass microsphere lens elements having underlying essentially continuous and contiguous hemispherical specular-reflecting caps, with all of the retroreflective complexes oriented to give optimum light retroreflection for the particular concentration of the complexes employed.

It is significant to observe that the etching treatment is effective to remove the metal from the outer surface approximately hemispherical portion of the microspheres without mechanical abrasion and without undue interference from any veneer of paintable binder solids which may remain on the outer surface metal portion of the microspheres. It may be that the veneer of paintable binder solids over the outer metal portion of the microspheres is in some cases porous or discontinuous. In any event, the thin veneer of binder solids has not been found to interfere with etching.

Of very significant importance is the fact that the mobile paintable composition must be essentially free of pigment particles of the extremely small size conventionally used in paints. Such particles not only mask over the metal-coated beads on drying of an applied film, but appear to cause increased binder solids to remain over the metal-coated beads, seriously impairing the effectiveness of etching. Thus, the paintable composition is maintained essentially free of pigment particles up to about 2 microns in size. On the other hand, discrete solid color particles above about 2 microns in size may be employed in the mobile paintable composition to gain coloration of an applied coating without significant interference with the required etching. Such larger-sized color particles tend to roll off the tops of metal-coated microspheres in a freshly applied layer. In essence, both the particles characterized as the fully metal-coated microspheres and the color particles added for daytime coloration must be above about 2 microns in size. Of course, those particles necessary to provide the composite retroreflection elements and those added for daytime coloration should be insoluble in the paintable vehicle in which they are dispersed. Particles of other character which dissolve in the paintable vehicle may be added in any size desired for the function they may perform.

In order to gain the required properties on coating, it is necessary to maintain the total quantity of discrete insoluble particles in the mobile paintable composition within certain limits based on the total quantity of solids ingredients in the composition. This relationship is independent of any volatile liquid content in the composition, for it is only the non-volatile solids ingredients which remain in an applied layer after volatilization of volatile ingredients. The quantity of discrete insoluble particles in the dried layer must be such as to exceed that quantity which would be fully flooded and embedded in the binder portion of a dried layer, but must remain below that quantity which would cause particulate projections so great from the dried layer as to weaken bonding to the point where the particles would not remain in place and withstand whatever handling to which the dried layer is subjected in manufacture, installation, and later use. A useful concept to describe this requirement is Particle Volume Concentration, meaning the relationship of the actual volume of discrete particles to the total of solids ingredients (i.e., the discrete particles plus paintable binder solids) in the composition. A particle volume concentration between 50% and 85% is needed to gain the results described. Below 50%, the quantity of paintable binder solids in the composition exceeds the limit for gaining the required projection caused by fully metal-coated beads in a dried layer (and it will be observed that this lower figure is somewhat high as compared to the conventional amount of pigment volume employed in conventional paints). Above 85%, insufficient binder solids are present for good anchorage of the discrete particles to a coated substrate. Preferably the particle volume concentration is maintained between 60% and 80%.

Where a reflex reflecting coating exhibiting attractive daytime color is desired, a quantity of discrete insoluble color particles (chromatic or achromatic), preferably opaque but optionally translucent or even transparent, may be used up to about 90% by volume of the total volume of all discrete particles above 2 microns (not inclusive of binder solids) in the composition, provided the volume concentration of fully metal-coated microspheres alone is at least about 7% of the total non-volatile solids (i.e., all particles and non-volatile paint binder) in the composition. Such a minimum of coated microspheres is needed for reasonable reflex-reflective properties. Practical attainment of reasonably true coloration under daytime conditions requires that at least about 10% by volume of the discrete particles in the composition should be color particles, preferably opaque. Illustrative color particles may be formed by bonding particles of conventional small pigment together into clusters with a silicate (e.g. a sodium silicate) binder. Pigment clusters are preferably spheroidal or nodular but permissibly irregular. They may also be formed using transparent coloring matter such as phthalocyanines, as well as by using organic binders insoluble in the paintable vehicle chosen. Flakes of metal may also be used as color particles. Of course, where the composition is to be applied over a colored base layer and the color of the base layer is desired for daytime visual appearance, the paintable composition may be maintained free of discrete color particles. In such cases, the translucency (even to the extent of being transparent) of the paintable binder permits the color of the substrate to show through between the locations of the metal-coated microspheres in the applied layer. Usually, where this feature is desired, the quantity of metal-coated microspheres will preferably be maintained somewhat less than the maximum of 85% particle volume concentration, say around 80%, down to as low a figure as about 50%.

Figure 3:
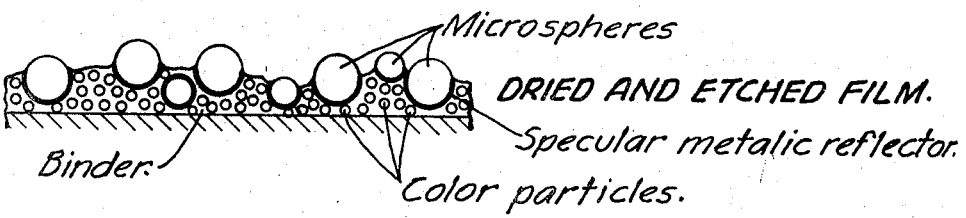
FIGURE 3 is a schematic cross section through the layer of FIGURE 2 after the surface thereof has been etched.

The metal-coated glass microspheres for these compositions are formed using glass beads up to about 85 microns in diameter, and preferably at least about 15 microns in diameter. The effective refractive index for the glass microspheres may vary from approximately 1.7 up to about 2.7, with a refractive index of about 1.9 being preferred for most brilliant retroreflection of light when the surface of the coating is dry, and a refractive index of about 2.6 preferred for efficient reflex-reflection when the surface of the coating is wet as caused by rain. Microspheres of different refractive index may be metallized and employed in admixture in coatings to provide resulting layers which exhibit reflex-reflection under a variety of environmental conditions. Further, where the surface of the structure as illustrated in FIGURE 3 is further coated with a layer of transparent resin (usually having a refractive index around 1.4 up to about 1.6), it is desirable to employ microspheres having a refractive index of at least about 2.2 or even 2.4 or higher.

Metal coating of glass microspheres may be accomplished in any known manner and, as such, forms no part of this invention. For example, silver may be coated about microspheres by placing the microspheres in a water bath wherein a reaction is promoted to deposit silver from silver nitrate (e.g., a water bath of silver nitrate, ammonia, dextrose and potassium hydroxide). Aluminum may be coated about microspheres by vapor deposition techniques. If other metal coatings, such as gold, copper, etc., are desired, they may be applied by any suitable means, whether chemical or physical in nature. The metal coating about microspheres is extremely thin, usually being no greater than one micron thick, generally less than about 0.1 micron in thickness.

Paintable vehicles in which the aforenoted particles are dispersed to form the compositions of the invention may vary widely, the fundamental requirement being that the vehicle must be paintable. In essence, this means that the vehicle is mobile and liquid, as distinguished from solid, in character. It may be a paintable transparent varnish vehicle, in which case the solids binder content may be dissolved in volatile solvents, or any of a variety of other paintable vehicles. "Paintable vehicle" contemplates only those vehicles which may be painted out on a surface (as by brushing, silk screening, spraying, knife coating, dipping, etc.) and form a continuous film on that surface upon drying, whether at room or elevated temperatures. Of course, elevated temperatures should be below the temperature of degradation of the solids paintable film-forming binder content. Drying as such may involve not only the volatilization of volatile ingredients from the coated film or layer, but also a curing of the film into a state insoluble in water and ordinary solvents such as turpentine, xylol, and the like. Drying may be accomplished by a heating step which promotes fusion or coalescence or integration of films of binder solids. Heating up to a temperature below heat degradation of the film may also be used in the drying step to promote a thermosetting-type curing reaction within the film. Of course, paintable film-forming vehicles are well known.

In the usual case, the volatile portion of paintable vehicles may vary from about 55% by weight, based on the weight of a paintable vehicle, up to about 95% based on that weight. Conversely, the resinous film-forming binder solids content for these paintable vehicles may vary from about 5 to 45% by weight based on the total weight of the vehicle. These values may possibly vary even further; but in general they are as noted, with the higher solids content being usually (but not solely) employed when non-thixotropic vehicles are used.

It is thus fitting to re-emphasize that the critical requirement for a mobile vehicle in which the particles are dispersed is that a paintability to form continuous paint-like films when coated as a thin paint-like layer on a substrate. It is not required that the paintable vehicle be transparent (although in many cases it is). Of the useful paintable vehicles, those of varnish character are most preferred.

Also, heating of an applied film during drying is preferred. Heating, suitably (and preferably) after some room temperature or normal drying has taken place, tends to cause flow-off of some of the solids material over coated microspheres, since the solids material exhibits an initial thermoplastic property even though it may later be cured or thermoset by the heat. Indeed, heating has caused up to approximately 50% improvement in light retroreflection of otherwise identically formed structures.

Figure 2:
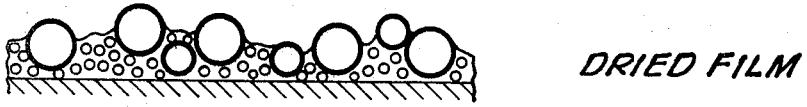
FIGURE 2 is a schematic cross section through the layer of FIGURE 1 after volatiles have been removed therefrom.

After a paint-like coating of the composition is formed and the volatile content thereof excluded by drying, one obtains a structure as illustrated in FIGURE 2 of the drawing. This structure may be sold in commerce, and later painted on limited areas and etched to provide any appropriate pattern or legend of reflex-reflective character over the face thereof.

Usually, however, etching will be accomplished promptly after the structure of FIGURE 2 is formed. Etching solutions useful in the practice of the invention have a pH other than within the range of 5 to 9. They may be either acidic or basic, although the choice in practice will depend upon the relative effectiveness of a solution for removal of the particular metal about the lenticular projecting portion of microspheres in a film. Thus, preferred results for removal of aluminum have been obtained at room temperature within about two minutes by using basic or alkaline solutions having a pH of about 14 (e.g., a water solution of 8% by weight sodium hydroxide with about 0.8% sodium gluconate), but suitable results for removal of aluminum have been gained within about 10 mintues at room temperature by using acidic solutions of pH of about 1 (e.g., about 85% phosphoric acid in water). Preferred etching of silver within a minute at room temperature may be accomplished with an acid solution having a pH of about 1 to 2 (e.g., a water solution of about 2.7% by weight sulfuric acid and about 0.9% by weight potassium dichromate). As the pH of etching solutions approaches 5 or 9 from the extremes of 1 and 14, respectively, the time for satisfactory etch removal of metal from the projecting portions of metal-coated microspheres is extended (even possibly to as long as 20 hours), but useful results are still obtained. Preferred rapid etching (within seconds up to about 15 or possibly 30 minutes) is accomplished when the pH of etching solutions is other than between 3 and 11. If desired, etching solutions may be given a pastry consistency by adding thickeners such as, for example, hydroxy ethyl cellulose. Etching may be accomplished, suitably at room temperature, by dipping the surface of a structure in a tank of etching solution, spraying etching solution over the surface, or by spatula application of pastry solutions (as where the film-forming composition is painted on installed signs or on box cars and the like).

After etching, the etching solution is washed from the surface, suitably by application of water (e.g., by spraying, tank dipping, etc.); and the resulting structure is then dried. Drying is suitably hastened by passing air over the structure, with or without the application of heat (again at a temperature for the film no higher than the temperature at which heat degradation of the binder takes place); and heating at this stage may effect further curing or alteration of the binder layer in relation to the other components of the layer (e.g., thermoplastic binders may soften and flow to some extent, but not so greatly as to destroy the critical optical characteristics for reflex-reflection).

A preferred example of the invention is as follows:

|  | Parts by weight in pounds | Solids bulking volume (gallons per pound) | Solid gallons equivalent of solids weight |
|---|---|---|---|
| Paintable Vehicle: | | | |
| Paintable alkyd resin (gelled with 60% by weight mineral spirits) | 27.4 | .1134 | 1.245 |
| Mineral spirits | 10.9 | | |
| Naphtha | 10.6 | | |
| Anti-skinning agent | 0.1 | | |
| Metal naphthanate driers (40% solids) | 0.4 | | |
| Blue spherical color particles | 26.3 | .087 | 2.29 |
| Aluminum coated transparent glass microspheres | 24.3 | .0333 | .81 |
| | 100.0 | | 4.345 |

Weight in pounds of the non-volatile solids times the solids bulking volume in gallons per pound gives the solids gallons equivalent of the weight of the solids ingredients.

The total solids gallons divided into the solids gallons total for the particles and microspheres (3.10) gives the particle volume concentration for the composition, which is 71.5%. The quantity of anti-skinning agent and driers in the composition is so negligible from a bulking standpoint as to be insignificant in making computations.

A preferred paintable alkyd resin, desirable because of its thixotropic characteristics, is available under the trademark "Burnock 3540" (a product of T. F. Washburn Company, Chicago, Illinois). It is a phthalic thixotropic soya alkyd resin having an acid number base of 6–10, a phthalic anhydride (base calculated) content of about 17%, and is believed to be disclosed in U.S. Patent No. 2,663,649. A suitable mineral spirits solvent commercially available is Shell solvent #140 which contains by weight about 68% of a mixture of paraffins, about 1% of a mixture of olefins, and about 31% of a mixture of naphthenes. It boils in the range of about 364° F. to 407° F. (at about 368° F., 10% of the mixture distills, and at 387° F., about 90% of it distills). It, as well as the naphtha (VM&P) are volatiles which escape from an applied coating under ordinary room temperature conditions and may be hastened in their volatilization by the application of heat. Antiskinning agents are well known to the art (a suitable one being "Exkin #2", containing an active ingredient such as butyraldoxime), and minimize the formation of a surface skin upon exposure to the atmosphere. Metal naphthanate varnish driers are also well known, e.g., a mixture of cobalt, manganese and lead naphthanates.

Blue spherical color particles for the composition may suitably be formed by mixing about 2.35 parts by weight of phthalocyanine blue with about 29.9 parts by weight of sodium silicate in a water solution and then spray drying the mixture in a heating stack which allows sprayed droplets to free-fall during drying and thereby to retain a spheroidal shape as caused by surface tension during the drying step. Particles then may be leached in acid to convert the sodium silicate to a silica gel. Particles made according to this process have been from about 5 up to about 70 microns in size.

The aluminum coated transparent glass microspheres preferably used for this composition have a vapor coating of aluminum of about 0.03 micron in thickness. The microspheres are about 1.9 in refractive index and vary from about 25 to 80 microns in size.

The composition is prepared by adding, with vigorous agitation, the volatile solvents and the antiskinning agent and driers to the alkyd resin at an elevated temperature of about 120° F. Agitation is continued for about 15 minutes until a smooth mixture is obtained. Then the color particles and metal-coated microspheres are stirred in and essentially uniformly dispersed. Upon cessation of agitation or stirring, the composition tends to gel up, thus evidencing its thixotropic character.

The composition at this point may be placed in cans and stored and shipped in commerce, or it may be used in preparing a coating which exhibits brilliant blue daytime color and a silvery nighttime reflex-reflection.

It has been sprayed, brushed, and silk screened on metal substrates such as commonly used in making signs. The application procedure may vary and is such as to form a thin paint-like film. Then, the volatile content is removed from the film. This is preferably accomplished by first allowing for air drying at normal room temperature, and then (after the film gives the appearance of being substantially dry) heating the film to about 250° F. (up to about 300° F.) for about 20 to 30 minutes. Heating hastens the cure of the varnish. Then an alkaline etch solution, as aforedescribed, is sprayed over the dried exposed surface of the coating, or the dried surface is dipped in a tank of such etching solution—allowing for about two minutes exposure at room temperature. Then the surface is washed free of etching material by water spray and the resulting structure dried by blasting it with hot air (at about 250° F.) for a few minutes.

It should be observed that the colored reflex-reflecting structure of this example possesses a combination of features never heretofore exhibited by reflex-reflecting layers insofar as is known. Its reflex-reflecting complexes are all oriented to face outwardly of the structure. All have continuous and contiguous underlying specular-reflecting metal caps. They are randomly positioned at varying levels in the structure, with random variations in the exact amount of metal removed from their outer surface and the exact extent of metal remaining to provide an underlying cap. Distributed in random fashion between the complexes are color particles of a larger size than conventional for pigment. The total effect is that of brilliant blue daytime coloration with a brilliant nighttime silvery reflex-reflection. The reflex-reflective light return for this structure is approximately 2.5 times, up to about 3 times, greater than that exhibited by a structure formed by painting or spraying a composition in all respects the same as the foregoing except for the fact that the glass microspheres therein were hemispherically coated with the aluminum and assumed random positions (with some metal caps sideways and even exterior of the lens elements) on drying.

Another illustrative composition is one having the same ingredients as in the foregoing specific illustrative composition except that the blue color pigment is omitted and the quantity of metal-coated microspheres increased to provide a resulting particle volume concentration of coated microspheres of about 71%. The formula in weight percent is: alkyd resin 20.3%, mineral spirits 8.1%, naphtha 3.1%, anti-skinning agent 0.1%, driers 0.3%, and metal-coated microspheres 68.1%. It contains about 76% by weight solids, with approximately 25.4% by weight of the vehicle phase being binder solids. Coated, dried by heating to 250° F. for 30 minutes, and etched as aforedescribed, this formula gave a resulting film which exhibited a photometer-reading reflex-reflection light return of about 45 to 55 photovolts as compared to a reading of about 20 photovolts for a film formed by painting and drying a composition of like character except that the fully metallized beads were replaced by hemispherically metallized ones which assumed random positions on drying.

Still another illustrative composition is one formed using a thermosetting acrylic resin paintable binder system having the formula, by weight: 18.7 parts of a volatile organic solvent solution of thermosetting acrylic resin (50% solids dissolved in a solvent system of 6 parts xylol, 2.2 parts butanol, and 1.8 parts methyl Cellosolve), 72 parts aluminum-coated transparent glass microspheres of 1.9 refractive index and a diameter from 20 to 75 microns, and 9.35 parts of butyl Cellosolve volatile solvent. The PVC for this composition is 70.5%. It contains 81.35% by weight solids and its vehicle contains a solid binder content of 36.9% by weight. Processed as described herein, reflex-reflective coatings were formed from this composition to give a photometer reading of about 37, which is well above what would be obtained from a sheet structure formed using a like composition containing hemispherically metallized lens elements which on coating assume random orientation.

That which is claimed is:

1. The method of making a retroreflective coating which consists essentially of the following steps: (1) applying on a substrate surface a substantially continuous paint-like film of a composition consisting essentially of particles larger than 2 microns in size dispersed in a mobile paintable vehicle, said particles being insoluble in said vehicle, said vehicle consisting of between 5 and 45% nonvolatile film-forming binder solids and correspondingly between 95 and 55% volatile liquid content, the particle volume concentration of said particles in said composition being between 50 and 85%, between 10 and 100% by volume of said particles being transparent glass microspheres of refractive index between 1.7 and 2.7 and a diameter between approximately 15 and 85 microns, said microspheres being essentially completely concentrically coated with a thin metal layer having a specular surface adjacent the glass surface of said microspheres, and between 0 and 90% by volume of said particles being colored particles between 2 and 70 microns in size, at least 7% of the solids volume of said composition being accounted for by said metal-coated microspheres, said composition being essentially free of pigment material up to 2 microns in size; (2) drying said paint-like film to substantially completely remove the volatile liquid content thereof at a temperature below the temperature of heat degradation of the non-volatile film-forming binder solids thereof, thereby to cause the exposed surface of said film to assume a lenticular irregularity as caused by metal-coated microspheres projecting said film outwardly in locations occupied by said microspheres; (3) applying to the exposed dried surface of said film an etching solution having a pH other than between 5 and 9 and retaining said etching solution over the exposed face of said film for a time and at a temperature sufficient to remove the metal from the outer surface lenticular portion of the metal-coated microspheres therein; and (4) washing said metal etching solution from the exposed surface of said film and removing the washing ingredients from said film.

2. The method of making a retroflective coating which consists essentially of the following steps: (1) applying on a substrate surface a substantially continuous paint-like film of a composition consisting essentially of particles larger than 2 microns in size dispersed in a mobile paintable transparent varnish vehicle, said particles being insoluble in said vehicle, said vehicle consisting of between 5 and 45% non-volatile film-forming binder solids and correspondingly between 95 and 55% volatile liquid content, the particle volume concentration of said particles in said composition being between 50 and 85%, between 10 and 100% by volume of said particles being transparent glass microspheres of refractive index between 1.7 and 2.7 and a diameter between approximately 15 and 85 microns, said microspheres being essentially completely concentrically coated with a thin metal layer having a specular surface adjacent the glass surface of said microspheres, and between 0 and 90% by volume of said particles being colored particles between 2 and 70 microns in size, at least 7% of the solids volume of said composition being accounted for by said metal-coated microspheres, said composition being essentially free of pigment material up to 2 microns in size; (2) drying said paint-like film to substantially completely remove the volatile liquid content thereof at a temperature below the temperature of heat degradation of the non-volatile film-forming binder solids thereof, thereby to cause the exposed surface of said film to assume a lenticular irregularity as caused by metal-coated microspheres projecting said film outwardly in locations occupied by said microspheres; (3) curing the non-volatile film-forming binder solids of said film at an elevated temperature below the temperature of heat degradation of said film-forming solids; (4) applying to the exposed dried surface of said film an etching solution having a pH other than between 3 and 11 and retaining said etching solution over the exposed face of said film for a time and at a temperature sufficient to remove the metal from the outer surface lenticular portion of the metal-coated microspheres therein; and (5) washing said metal etching solution from the exposed surface of said film with water and removing the washing water from said film.

3. As a new article of manufacture: a structure exhibiting daytime coloration and convertible to exhibit nighttime retroflection of incident light, said structure comprising a dried paintable binder layer which is essentially free of pigment particles up to about 2 microns in size and in which is randomly distributed at random levels, in largely a monolayer condition, a mass of particles greater than 2 microns in size, between 10 and 90% of the solids volume of said particles being discrete particles which are colored, and between 10 and 90% of the solids volume of said particles being discrete metal-coated microspheres all of said metal-coated microspheres consisting essentially of transparent glass microspheres fully adherently coated with metal having a specular surface adjacent the glass surface of said microspheres, said glass microspheres being between about 15 and 85 microns in diameter and having a refractive index between about 1.7 and 2.7, some of said metal-coated microspheres being fully flooded by said binder layer and some partially projecting from said layer with a thin veneer of said binder over said projecting portion, said particles in said layer being present in an amount to account for between 50 and 85% of the volume of ingredients in said layer, at least 7% of the total volume of ingredients in said layer being said metal-coated microspheres.

4. The article of claim 3 in which the metal coating on the microspheres is vapor-deposited aluminum.

5. The article of claim 3 in which the metal coating on the microspheres is silver.

6. The article of claim 3 in which at least some of the transparent glass microspheres have a refractive index of about 1.9.

7. The article of claim 3 in which at least some of the transparent glass microspheres have a refractive index of about 2.6.

8. As a new article of manufacture: A retroflective structure exhibting daytime coloration and nighttime retroflection of incident light, said structure comprising a dried paintable binder layer essentially free of pigment particles up to about 2 microns in size and in which is randomly distributed at random levels, in largely a monolayer condition, a mass of particles greater than 2 microns in size, between 10 and 90% of the solids volume of said particles being discrete particles which are colored, and between 10 and 90% of the solids volume of said particles being glass microspheres adherently coated with metal, certain of said metal-coated microspheres being fully metal-coated and fully flooded by said binder layer and the remainder of said metal-coated microspheres being retroflective elements all consisting essentially of discrete transparent glass microspheres partially projecting from said binder layer, said projecting microspheres having an underlying specular-reflective hemispherical metal cap embedded in said binder layer such that the portion of said microspheres not covered by the metallic cap is oriented to the front retroreflective face of said structure, said glass microspheres being between about 15 and 85 microns in diameter and having a refractive index between about 1.7 and 2.7, said particles in said layer being present in an amount to account for between 50 and 85% of the volume of ingredients of said layer, at least about 7% of the total volume of ingredients in said layer being said metal-capped microspheres.

9. The article of claim 8 in which the metal capping on the microspheres is vapor-deposited aluminum.

10. The article of claim 8 in which the metal capping on the microspheres is silver.

11. The article of claim 8 in which at least some of the transparent glass microspheres have a refractive index of about 1.9.

12. The article of claim 8 in which at least some of the transparent glass microspheres have a refractive index of 2.6.

References Cited
UNITED STATES PATENTS

| | | | |
|---|---|---|---|
| 2,574,971 | 11/1951 | Heltzer | 350—105 |
| 3,286,604 | 11/1966 | De Vries | 350—105 |
| 3,253,146 | 5/1966 | De Vries | 350—105 |
| 3,254,563 | 6/1966 | De Vries et al. | 350—105 |
| 3,274,888 | 9/1966 | Vonstrum et al. | 350—105 |
| 3,288,618 | 11/1966 | De Vries | 350—105 |

DAVID SCHONBERG, *Primary Examiner.*

P. R. GILLIAM, *Assistant Examiner.*

U.S. Cl. X.R.

117—27